US008478433B2

(12) United States Patent
Seem et al.

(10) Patent No.: US 8,478,433 B2
(45) Date of Patent: Jul. 2, 2013

(54) FAULT DETECTION SYSTEMS AND METHODS FOR SELF-OPTIMIZING HEATING, VENTILATION, AND AIR CONDITIONING CONTROLS

(75) Inventors: John E. Seem, Glendale, WI (US); Yaoyu Li, Franklin, WI (US); Timothy Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/226,405

(22) Filed: Sep. 6, 2011

(65) Prior Publication Data

US 2011/0320045 A1 Dec. 29, 2011

Related U.S. Application Data

(63) Continuation of application No. 12/323,293, filed on Nov. 25, 2008, now Pat. No. 8,027,742, which is a continuation-in-part of application No. PCT/US2008/070091, filed on Jul. 15, 2008.

(60) Provisional application No. 60/950,314, filed on Jul. 17, 2007.

(51) Int. Cl.
*G06F 19/00* (2006.01)

(52) U.S. Cl.
USPC .................................. 700/38; 700/28; 714/37

(58) Field of Classification Search
USPC ................ 700/28, 29, 30, 31, 32, 33, 34, 38, 700/275, 276, 299, 300; 714/37, 39, E11.024
See application file for complete search history.

(56) References Cited

U.S. PATENT DOCUMENTS

| | | | |
|---|---|---|---|
| 2,812,141 | A | 11/1957 | Sueda et al. |
| 3,181,791 | A | 5/1965 | Axelrod |
| 4,026,251 | A | 5/1977 | Schweitzer et al. |
| 4,114,807 | A | 9/1978 | Naseck et al. |
| 4,182,180 | A | 1/1980 | Mott |
| 4,199,101 | A | 4/1980 | Bramow et al. |
| 4,257,238 | A | 3/1981 | Kountz et al. |
| 4,319,461 | A | 3/1982 | Shaw |

(Continued)

FOREIGN PATENT DOCUMENTS

| | | | |
|---|---|---|---|
| JP | 63231127 | A | 9/1988 |
| JP | 04062352 | A | 2/1992 |

(Continued)

OTHER PUBLICATIONS 90.1 User's Manual, Energy Standard for Buildings Except Low-Rise Residential Buildings, ANSI/ASHRAE/IESNA Standard 90.1-2004, 7 pages.

(Continued)

*Primary Examiner* — Charles Kasenge
(74) *Attorney, Agent, or Firm* — Foley & Lardner LLP

(57) ABSTRACT

A fault detection system for detecting a fault in a process system includes a first circuit configured to modify an input of the process system with a modifying signal. The fault detection system further includes a second circuit configured to receive an output from the process system and configured to determine whether the fault exists based on at least one of a reduction of a signal component and an unexpected transformation of the signal component, wherein the signal component corresponds to a function of the modifying signal.

19 Claims, 13 Drawing Sheets

U.S. PATENT DOCUMENTS

| | | | |
|---|---|---|---|
| 4,367,631 | A * | 1/1983 | Johnson et al. .................. 62/79 |
| 4,512,161 | A | 4/1985 | Logan et al. |
| 4,558,595 | A | 12/1985 | Kompelien |
| 4,607,789 | A | 8/1986 | Bowman |
| 4,872,104 | A | 10/1989 | Holsinger |
| 4,876,858 | A | 10/1989 | Shaw et al. |
| 4,942,740 | A | 7/1990 | Shaw et al. |
| 5,251,814 | A | 10/1993 | Warashina et al. |
| 5,346,129 | A | 9/1994 | Shah et al. |
| 5,351,855 | A | 10/1994 | Nelson et al. |
| 5,355,305 | A | 10/1994 | Seem et al. |
| 5,414,640 | A | 5/1995 | Seem |
| 5,461,877 | A | 10/1995 | Shaw et al. |
| 5,467,287 | A | 11/1995 | Wenner et al. |
| 5,506,768 | A | 4/1996 | Seem et al. |
| 5,555,195 | A | 9/1996 | Jensen et al. |
| 5,568,377 | A | 10/1996 | Seem et al. |
| 5,590,830 | A | 1/1997 | Kettler et al. |
| 5,623,402 | A * | 4/1997 | Johnson ......................... 700/42 |
| 5,675,979 | A | 10/1997 | Shah |
| 5,682,329 | A | 10/1997 | Seem et al. |
| 5,746,061 | A | 5/1998 | Kramer |
| 5,769,315 | A | 6/1998 | Drees |
| 5,791,408 | A | 8/1998 | Seem |
| 5,867,384 | A | 2/1999 | Drees et al. |
| 6,006,142 | A | 12/1999 | Seem et al. |
| 6,098,010 | A | 8/2000 | Krener et al. |
| 6,115,713 | A | 9/2000 | Pascucci et al. |
| 6,118,186 | A | 9/2000 | Scott et al. |
| 6,122,605 | A | 9/2000 | Drees et al. |
| 6,161,764 | A | 12/2000 | Jatnieks |
| 6,219,590 | B1 | 4/2001 | Bernaden, III et al. |
| 6,223,544 | B1 | 5/2001 | Seem |
| 6,265,843 | B1 | 7/2001 | West et al. |
| 6,269,650 | B1 | 8/2001 | Shaw |
| 6,296,193 | B1 | 10/2001 | West et al. |
| 6,326,758 | B1 | 12/2001 | Discenzo |
| 6,369,716 | B1 | 4/2002 | Abbas et al. |
| 6,389,331 | B1 | 5/2002 | Jensen et al. |
| 6,408,228 | B1 | 6/2002 | Seem et al. |
| 6,415,617 | B1 | 7/2002 | Seem |
| 6,477,439 | B1 | 11/2002 | Bernaden, III et al. |
| 6,594,554 | B1 | 7/2003 | Seem et al. |
| 6,816,811 | B2 | 11/2004 | Seem |
| 6,862,540 | B1 | 3/2005 | Welch et al. |
| 6,937,909 | B2 | 8/2005 | Seem |
| 6,973,793 | B2 | 12/2005 | Douglas et al. |
| 7,031,880 | B1 | 4/2006 | Seem et al. |
| 7,050,873 | B1 | 5/2006 | Discenzo |
| 7,113,890 | B2 | 9/2006 | Frerichs et al. |
| 7,124,637 | B2 | 10/2006 | Singhal et al. |
| 7,434,413 | B2 | 10/2008 | Wruck |
| 7,578,734 | B2 | 8/2009 | Ahmed et al. |
| 7,685,830 | B2 | 3/2010 | Thybo et al. |
| 7,827,813 | B2 | 11/2010 | Seem |
| 8,027,742 | B2 * | 9/2011 | Seem et al. .................... 700/38 |
| 2003/0109963 | A1 * | 6/2003 | Oppedisano et al. ......... 700/276 |
| 2004/0164690 | A1 | 8/2004 | Degner et al. |
| 2005/0006488 | A1 | 1/2005 | Stanimirovic |
| 2005/0040250 | A1 | 2/2005 | Wruck |
| 2006/0016201 | A1 * | 1/2006 | Kopel ............................ 62/129 |
| 2006/0090467 | A1 | 5/2006 | Crow |
| 2006/0259285 | A1 | 11/2006 | Bahel et al. |
| 2007/0023533 | A1 | 2/2007 | Liu |
| 2007/0191967 | A1 | 8/2007 | Yo et al. |
| 2008/0097651 | A1 | 4/2008 | Shah et al. |
| 2008/0179408 | A1 | 7/2008 | Seem |
| 2008/0179409 | A1 | 7/2008 | Seem |
| 2008/0277486 | A1 | 11/2008 | Seem et al. |
| 2009/0001179 | A1 | 1/2009 | Dempsey |
| 2009/0083583 | A1 | 3/2009 | Seem et al. |
| 2009/0099698 | A1 | 4/2009 | Masui et al. |
| 2009/0308941 | A1 | 12/2009 | Patch |
| 2010/0082161 | A1 | 4/2010 | Patch |
| 2010/0106328 | A1 | 4/2010 | Li et al. |
| 2010/0106331 | A1 | 4/2010 | Li et al. |

FOREIGN PATENT DOCUMENTS

| | | | |
|---|---|---|---|
| JP | 10047738 | A | 2/1998 |
| SU | 535103 | A | 11/1976 |
| WO | WO 00/68744 | | 11/2000 |
| WO | WO 2009/012269 | A2 | 1/2009 |
| WO | WO 2009/012282 | A2 | 1/2009 |

OTHER PUBLICATIONS

Adetola et al., Adaptive Extremum-Seeking Receding Horizon Control of Nonlinear Systems, American Control Conference Proceedings, 2004, pp. 2937-2942.

Adetola et al., Adaptive output feedback extremum seeking receding horizon control of linear systems, ScienceDirect, Elsevier, Journal of Process Control, 2006, pp. 521-533, vol. 16.

Adetola et al., Parameter convergence in adaptive extremum-seeking control, ScienceDirect, Elsevier, automatica, available online Sep. 28, 2006, apges 105-110, vol. 43.

Ariyur et al., Analysis and Design of Multivariable Extremum Seeking, Proceedings of the American Control Conference, Anchorage, Alaska, May 8-10, 2002, pp. 2903-2908.

Ariyur et al., Multivariable Extremum Seeking Feedback: Analysis and Design, see IDS for date information, pp. 1-15.

Ariyur et al., Real Time Optimization by Extremum Seeking Control, John Wiley & Sons, Oct. 2003, 230 pages.

Ariyur et al., Slope Seeking and Application to Compressor Instability Control, Proceeding of the 41st IEEE Conference on Decision and Control, Las Vegas, Nevada, Dec. 2002, pp. 3690-3697.

Ariyur et al., Slope seeking: a generalization of extremum seeking, International Journal of Adaptive Control and Signal Processing, 2004, pp. 1-22, vol. 18.

Ashrae Standard, Energy Standard for Buildings Except Low-Rise Residential Buildings I-P. Edition, ANSI/ASHRAE/IESNA Standard 90.1-2004, 4 pages.

Astrom et al., Optimalizing Control, Adaptive Control Second Edition, 1995, pp. 214-230, Addison-Wesley Publishing Company, USA.

Banaszuk et al., Adaptive Control of Combustion Instability Using Extremum-Seeking, Proceedings of the American Control Conference, Chicago, Illinois, Jun. 2000, pp. 416-422.

Banavar et al., Functional Feedback in an Extremum Seeking Loop, Proceedings of the 40th IEEE Conference on Decision and Control, Orlando, Florida, Dec. 2001, pp. 1316-1321, 8 pages.

Banavar, R.N., Extremum seeking loops with quadratic functions: estimation and control, International Journal of Control, 2003, pp. 1475-1482, vol. 76, No. 14.

Beaudoin et al., Bluff-body drag reduction by extremum-seeking control, Journal of Fluids and Structures, 2006, pp. 973-978, vol. 22.

Binetti et al., Control of Formation Flight via Extremum Seeking, Proceedings of the American Control Conference, Anchorage, Alaska, May 8-10, 2002, pp. 2848-2853.

Blackman, P.F., Extremum-Seeking Regulators, An Exposition of Adaptive Control, Pergamon Press, 1962, 17 pages.

Cowan, Review of Recent Commercial Roof Top Unit Field Studies in the Pacific Northwest and California, report for Northwest Power and Conservation Council and Regional Technical Forum, Oct. 8, 2004, 18 pages.

DOE Federal Emergency Management Program, Actions You Can Take to Reduce Cooling Costs, taken from http://www1.eere.energy.gov/femp/pdfs/om_cooling.pdf, believed to be available May 2005, 8 pages.

Drakunov et al., ABS Control Using Optimum Search via Sliding Modes, IEEE Transactions on Control Systems Technology, Mar. 1995, pp. 79-85, vol. 3, No. 1.

Examination Report for G.B. Patent Application No. 1000634.4, mailed Aug. 30, 2011, 2 pages.

Financial Times Energy, Inc. Economizers, Energy Design Resources, taken from http://www.energydesignresources.com/resource/28/, believed to be available by at least Jan. 2007, 30 pages.

Guay et al., Adaptive extremum seeking control of nonlinear dynamic systems with parametric uncertainities, ScienceDiet, Pergamon, Automatica, 2003, pp. 1283-1293.

International Search Report and Written Opinion for International Patent Application No. PCT/US2008/070091, mailed Sep. 30, 2009, 13 pages.
International Search Report and Written Opinion for International Patent Application No. PCT/US2008/070118, mailed Oct. 19, 2009, 11 pages.
Killingsworth et al., PID Turning Using Extremum Seeking, IEEE Control Systems Magazine, Feb. 2006, pp. 70-79.
Krstic et al., Stability of extremum seeking feedback for general nonlinear dynamic systems, Automatica, Mar. 1997, vol. 36, pp. 595-601.
Krstic, Miroslav, Extremum Seeking Control for Discrete-Time Systems; IEEE Transactions on Automatic Control, University of California Postprints, 2002, pp. 318-323, 8 pages.
Krstic, Miroslav, Performance improvement and limitations in extremum seeking control, Dec. 1998, pp. 313-326, Department of Mechanical and Aerospace Engineering, University of California, San Diego, La Jolla, CA, USA.
Larsson, Stefan, Literature Study on Extremum Control, Control and Automation Laboratory, Nov. 2001, pp. 1-14, Department of Signals and Systems, Chalmers University of Technology.
Leblanc, M. Sur l'electrification des Chemins de fer au Moyen de Courants Alternatifs de Frequence Elevee, Revue Generale de l'Electricite, 1922, 4 pages.
Leyva et al., MPPT of Photovoltaic Systems using Extremum-Seeking Control, IEEE Transactions on Aerospace and Electronic Systems, Jan. 2006, vol. 42, No. 1, pp. 249-258.
Li et al., Extremum Seeking Control of a Tunable Thermoacoustic Cooler, IEEE Transactions on Control Systems Technology, pp. 527-536, vol. 13, No. 4., Jul. 2005, pp. 527-536.
Liu et al., Extremum-seeking with variable gain control for intensifying biogas production in anaerobic fermentation, Water Science & Technology, 2006, vol. 53, No. 4-5, pp. 35-44.
Marcos et al., Adaptive extremum-seeking control of a continuous stirred tank bioreactor with Haldane's Kinetics, Journal of Process Control, 2004, vol. 14, pp. 317-328.
Office Action for U.S. Appl. No. 11/699,859, dated Mar. 15, 2010, 12 pages.
Office Action for U.S. Appl. No. 11/699,860 dated Jun. 9, 2010, 9 pages.
Office Action for U.S. Appl. No. 11/699,860, dated Aug. 20, 2009, 18 pages.
Office Action for U.S. Appl. No. 12/683,883, dated Sep. 19, 2011, 7 pages.
Office Action for U.S. Appl. No. 12/323,293, dated Feb. 3, 2011, 10 pages.
Office Action for U.S. Appl. No. 12/650,366, dated Oct. 20, 2011, 18 pages.
Pan et al., Discrete-Time Extremum Seeking Algorithms, Proceedings of American Control Conference, Anchorage, Alaska, May 2002, pp. 3753-3758, 8 pages.
Popovic et al., Extremum seeking methods for optimzation of variable cam timing engine operation, Proceedings of the American Control Conference, Jun. 4-6, 2003, Denver, CO, USA, pp. 3136-3141.
Rotea, Analysis of Multivariable Extremum Seeking Algorithms, Proceedings of the American Control Conference, pp. 433-437, Jun. 2000, Chicago, IL, USA.
Salsbury, A Controller for HVAC Systems with Embedded Fault Detection Capabilities Based on Simulation Models, presented at the International Building Simulation Conference in Kyoto, Japan, Sep. 1999, 8 pages.
Sane et al., Building HVAC Control Systems—Role of Controls and Optimization, Proceedings of the American Control Conference Minneapolis, Minnesota, Jun. 14-16, 2006, 6 pages.
Speyer et al., Extremum Seeking Loops with Assumed Functions, Proceedings of the 39th IEEE Conference on Decision and Control, Sydney, Australia, Dec. 2000, pp. 142-147, 8 pages.
Sternby, Extremum Control Systems—An Area for Adaptive Control?, see IDS for date information, 12 pages, Department of Automatic Control, Lund Institute of Technology, Lund, Sweden.
Teel et al., Solving Smooth and Nonsmooth Multivariable Extremum Seeking Problems by the Methods of Nonlinear Programming, Proceedings of American Control Conference, Arlington, Virgina, Jun. 2001, pp. 2394-2399, 8 pages.
Teel, A.R., Lyapunov Methods in Nonsmooth Optimization, Part I: Quasi-Newton Algorithms for Lipschitz, Regular Functions, Proceedings of the 39th IEEE Conference on Decision and Control, Sydney, Australia, Dec. 2000, pp. 112-117, 8 pages.
Teel, A.R., Lyapunov Methods in Nonsmooth Optimization, Part II: Persistenly Exciting Finite Differences, Proceedings of the 39th IEEE Conference on Decision and Control, Sydney, Australia, Dec. 2000, pp. 118-123, 8 pages.
Titica et al., Adaptive Extremum Seeking Control of Fed-Batch Bioreactors, European Journal of Control, vol. 9, 2003, pp. 618-631.
Tsien, H.S., Engineering Cybernetics, McGraw-Hill Book Company, Inc., 1954, 298 pages.
Tunay, I., Antiskid Control for Aircraft via Etremum-Seeking, Proceedings of American Control Conference, Arlington, Virgina, Jun. 2001, pp. 665-670, 8 pages.
Walsh, On the Application of Multi-Parameter Extremum Seeking Control, Proceedings of the American Control Conference, pp. 411-415, Jun. 2000, Chicago, IL, USA.
Wang et al., Experimental Application of Extremum Seeking on an Axial-Flow Compressor, IEEE Transactions on Control Systems Technology, Mar. 2000, vol. 8, No. 2, pp. 300-309.
Wang et al., Extremum Seeking for Limit Cycle Minimization, IEEE Transactions on Automatic Control, Dec. 2000, vol. 45, No. 12, pp. 2432-2437.
Wang et al., Optimizing Bioreactors by Extremum Seeking, International Journal of Adaptive Control and Signal Processing, 1999, pp. 651-669.
Yu et al., Extremum-Seeking Control Strategy for ABS System with Time Delay, Proceedings of American Control Conference, Anchorage, Alaska, May 2002, pp. 3753-3758, 8 pages.
Yu et al., Extremum-Seeking Control via Sliding Mode with Periodic Search Signals, Proceedings of the 41st IEEE Conference on Decision and Control, Las Vegas, Nevada, Dec. 2002, pp. 323-328, 8 pages.
Zhang et al., Extremum-Seeking Nonlinear Controllers for a Human Exercise Machine, IEEE/ASME Transactions on Mechatronics, Apr. 2006, vol. 11, No. 2, pp. 233-240.
Zhang, Y., Stability and Performance Tradeoff with Discrete Time Triangular Search Minimum Seeking, Proceedings of American Control Conference, Chicago, Illinois, Jun. 2000, pp. 423-427, 7 pages.
Office Action for U.S. Appl. No. 13/325,971, mail date Dec. 18, 2012, 12 pages.

* cited by examiner

FAULT DETECTION SYSTEMS AND METHODS FOR SELF-OPTIMIZING HEATING, VENTILATION, AND AIR CONDITIONING CONTROLS

CROSS-REFERENCE TO RELATED APPLICATIONS

The present application is a continuation of U.S. application Ser. No. 12/323,293, filed Nov. 25, 2008, which is a continuation-in-part of International Application No. PCT/US2008/070091, filed Jul. 15, 2008, which claims the benefit of U.S. Provisional Application No. 60/950,314, filed Jul. 17, 2007. The entire contents of U.S. application Ser. No. 12/323,293, PCT Application No. PCT/US2008/070091 and U.S. Provisional Application No. 60/950,314 are hereby incorporated by reference.

BACKGROUND

The present application relates generally to the field of heating, ventilation, and air conditioning (HVAC) control. More specifically, the present application relates to fault detection systems and methods for self-optimizing HVAC control.

Self-optimizing control strategies are used in the field of HVAC control to optimize the performance of one or more HVAC control loops. For example, in an air-side economizer application, a damper driven by a self-optimizing control strategy is used to minimize the energy consumption of an air handling unit (AHU) by using cool outside air to cool an indoor space (e.g., when conditioning outside air is more energy efficient than cooling and conditioning recirculated air).

Component malfunctioning in self-optimized control loops can present a number of problems. For example, a faulty component utilized in a self-optimized control loop can impair functionality and lead to energy waste rather than energy savings. More particularly, in the air-side economizer example, damper malfunctioning prevents acceptable air handling unit (AHU) operation. Damper faults include failed actuator, damper obstruction, de-coupled linkage, and other errors.

What is needed is a system and method for detecting faults in HVAC systems using self-optimizing control strategies.

SUMMARY

One embodiment of the invention relates to a method for detecting a fault in a process system. The method includes modifying an input of the process system with a modifying signal. The method also includes monitoring an output of the process system for a signal component corresponding to a function of the modifying signal and determining that the fault exists based on at least one of a reduction of the signal component and an unexpected transformation of the signal component.

Another embodiment of the invention relates to a fault detection system for detecting a fault in a process system. The fault detection system includes a first circuit configured to modify an input of the process system with a modifying signal. The fault detection system further includes a second circuit configured to receive an output from the process system and configured to determine whether the fault exists based on at least one of a reduction of a signal component and an unexpected transformation of the signal component, wherein the signal component corresponds to a function of the modifying signal.

Another embodiment of the invention relates to a controller for detecting a fault in a process system. The controller includes a circuit configured to affect an input of the process system, the circuit configured to modify the input with a modifying signal, wherein the circuit is further configured to monitor an output of the process system for a signal component corresponding to a function of the modifying signal, and wherein the circuit is further configured to determine whether the fault exists based on at least one of a reduction of the signal component and an unexpected transformation of the signal component.

Alternative exemplary embodiments relate to other features and combinations of features as may be generally recited in the claims.

BRIEF DESCRIPTION OF THE FIGURES

The disclosure will become more fully understood from the following detailed description, taking in conjunction with the accompanying figures, wherein like reference numerals refer to like elements, in which.

DETAILED DESCRIPTION OF THE EXEMPLARY EMBODIMENTS

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for detecting faults in a self-optimizing control system are shown. A modified signal is applied to an input of a process system and an output of the process system is monitored for a signal component that is a function of the modified input signal. A fault is determined to exist based on a reduction of the signal component or an unexpected transformation of the signal component. Some of the embodiments described relate specifically to the use of a fault detection circuit with an extremum seeking controller. Perturbed inputs of the process system provided by the extremum seeking controller can be used for optimization purposes and for fault detection purposes, with the system determining that a fault exists when the perturbed input does not result in an expected and/or corresponding output. In the HVAC context, and particularly in the air-side economizer context, a self-optimizing control strategy used to adjust a damper that affects the outside air provided to an AHU can be monitored for faults by checking for the existence of an expected signal component at an output of the self-optimizing control strategy (e.g., by examining a performance measure of the process system used by the self-optimizing control strategy).

Figure 1:
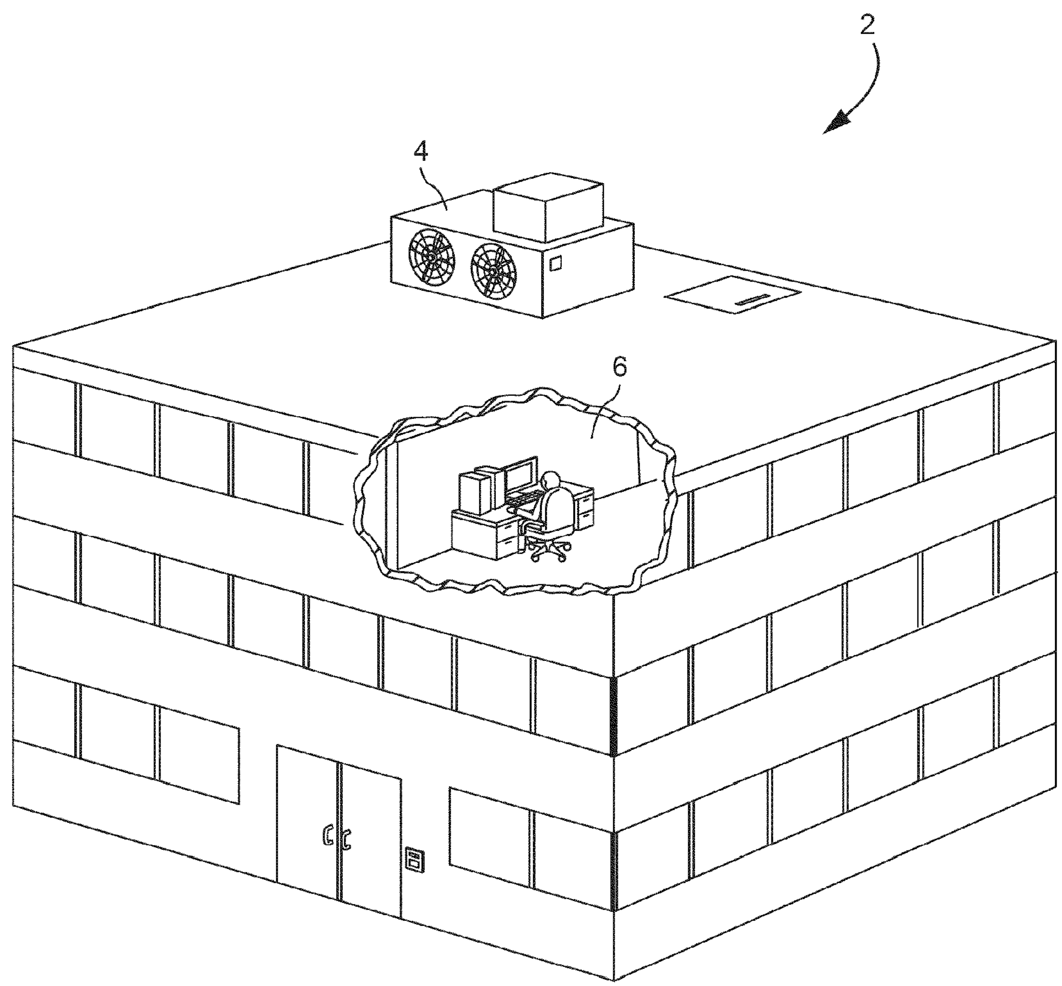
FIG. 1 is a perspective view of a building with an HVAC system having an AHU, according to an exemplary embodiment.

FIG. 1 is a perspective view of a building 2 with an HVAC system, according to an exemplary embodiment. As illustrated, building 2 includes an AHU 4 that is part of an HVAC system that is used to condition, chill, heat, and/or control the environment of an interior area 6 of building 2. The control system for AHU 4 is configured to utilize an extremum seeking control (ESC) strategy to provide economizer functionality; optimizing the flow of air provided to AHU 4 from the outside in order to minimize the power consumption of AHU 4.

ESC is a class of self-optimizing control strategies that can dynamically search for inputs of an unknown and/or time-varying system to optimize performance of the system. One application for ESC is to provide economizer control to an AHU, seeking to optimize the behavior of a damper controlled by an actuator to minimize the power consumption of the AHU. ESC can also be used for other applications inside and outside the HVAC industry (e.g., wind turbine control, fluid pump control, energy delivery control, etc.). In an ESC strategy, a gradient of process system output with respect to process system input is typically obtained by slightly perturbing the operation of the system and applying a demodulation measure. Optimization of process system performance is obtained by driving the gradient towards zero by using an integrator or another mechanism for reducing the gradient in a closed-loop system.

According to other exemplary embodiments, building 2 may contain more AHUs. Each AHU may be assigned a zone (e.g., area 6, a set of areas, a room, part of a room, a floor, a part of a floor, etc.) of building 2 that the AHU is configured to affect (e.g., condition, cool, heat, ventilate, etc.). Each zone assigned to an AHU may be further subdivided through the use of variable air volume boxes or other HVAC configurations.

While the present application describes the invention with frequent reference to the application of air-side economizers in HVAC systems, the present invention may be utilized with applications and self-optimizing control loops other than those described herein.

Figure 2:
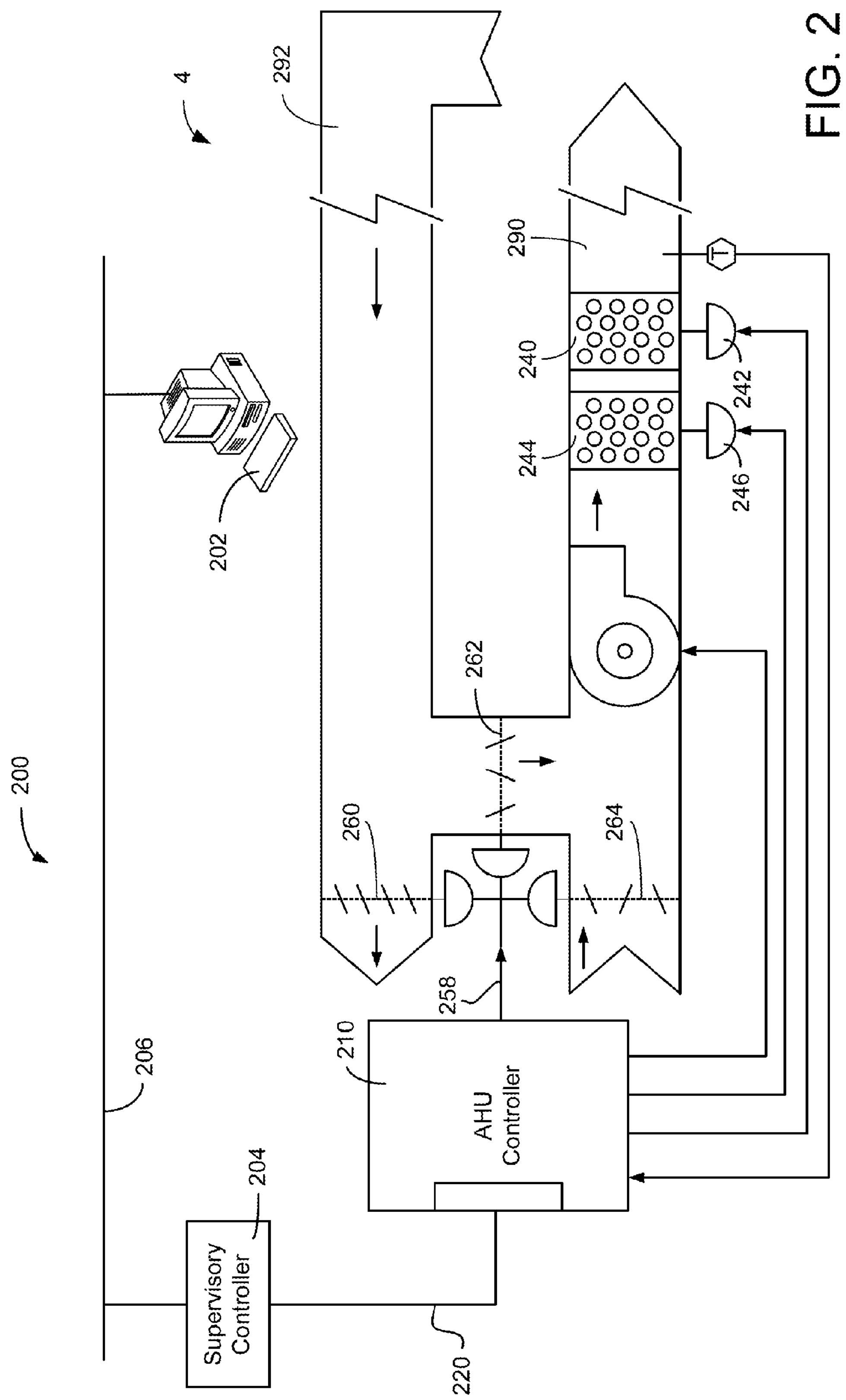
FIG. 2 is a schematic diagram of an HVAC system having an AHU, according to an exemplary embodiment.

Referring now to FIG. 2, a schematic diagram of an environmental control system 200 (e.g., HVAC control system) having an AHU 4 is shown, according to an exemplary embodiment. Environmental control system 200 includes a workstation 202, a supervisory controller 204 (e.g., a network automation engine (NAE)), and an AHU controller 210. According to an exemplary embodiment, AHU controller 210 is configured to utilize an ESC strategy. AHU controller 210 is coupled to supervisory controller 204 via communications link 220. Workstation 202 and supervisory controller 204 are coupled via a communications bus 206. Communications bus 206 may be coupled to additional sections or additional controllers, as well as other components utilized in environmental control system 200. Environmental control system 200 may be a building automation system such as a METASYS® brand system manufactured by Johnson Controls, Inc.

Figure 3:
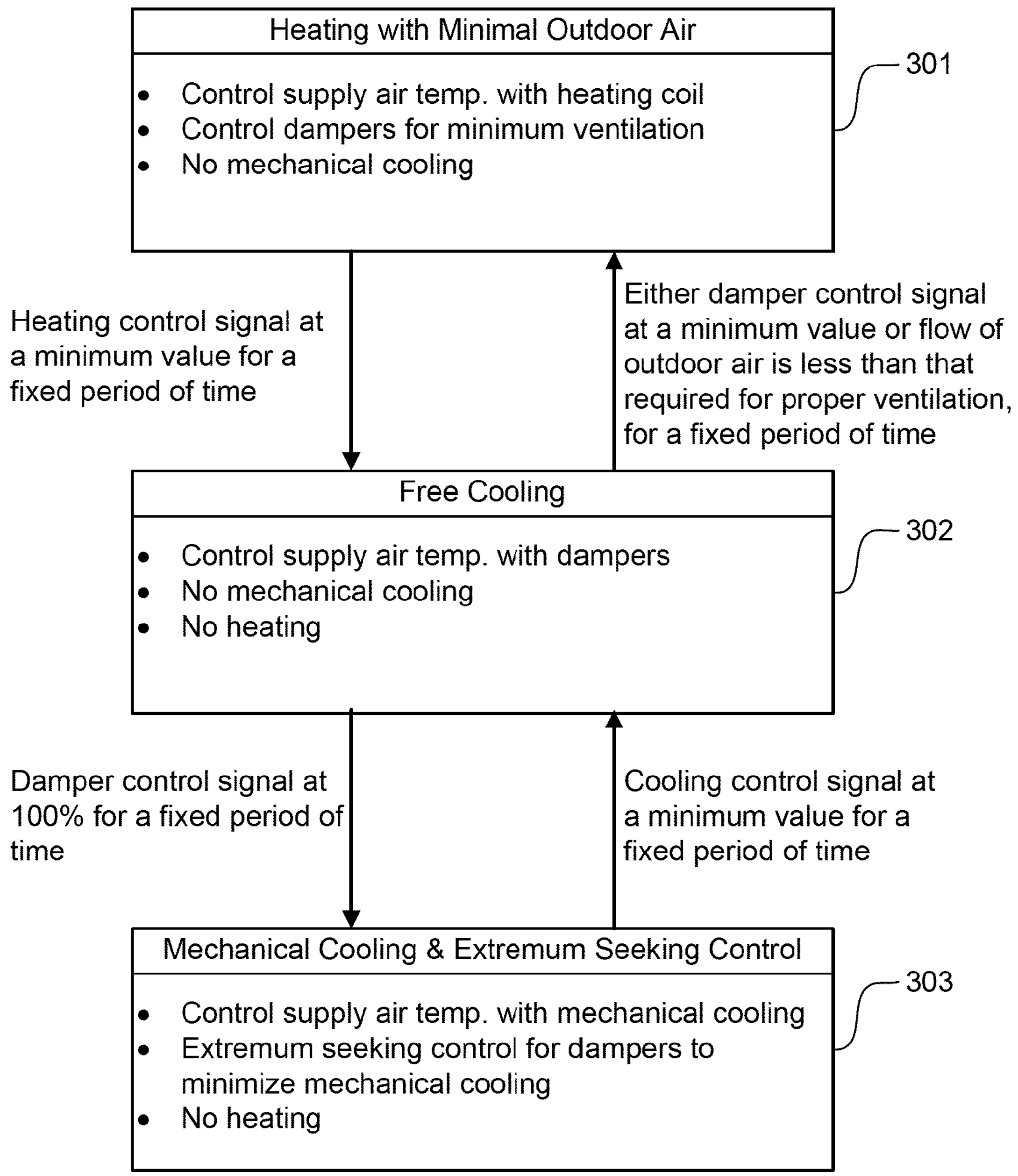
FIG. 3 is a flow chart of a finite state machine of the HVAC system of FIG. 2, according to an exemplary embodiment.

Referring now to FIGS. 2 and 3, controller 210 is operatively associated with AHU 4 and controller 210 is configured to operate as a finite state machine with the three states depicted in FIG. 3, according to an exemplary embodiment. Controller 210 operates AHU 4 using ESC when in state 303. A transition occurs from one state to another, as indicated by the arrows, when a specified condition or set of conditions occurs. In an exemplary embodiment, operation data of AHU 4 is checked when controller 210 is in a given state to determine whether a transition condition exists. A transition condition may be a function of the present state of the system, a specific time interval, a temperature condition, a supply air condition, a return air condition and/or other conditions that may exist and be utilized by controller 210.

In cold climates, the initial state of control is heating in state 301. The system starts up in state 301 to minimize the potential that cooling coil 244 and/or heating coil 240 will freeze. In state 301, valve 242 for heating coil 240 is controlled to modulate the flow of hot water, steam, or electricity to heating coil 240, thereby controlling the amount of energy transferred to the air in an effort to maintain the supply air temperature at the setpoint. Dampers 260, 262, and 264 are positioned for a minimum flow rate of outdoor air and there is no mechanical cooling, (i.e., chilled water valve 246 is closed). The minimum flow rate of outdoor air is the least amount required for satisfactory ventilation to the supply duct 290. For example, 20% of the air supplied to duct 290 is outdoor air. The condition for a transition to state 302 from state 301 is defined by the heating control signal remaining in the "No Heat Mode." Such a mode occurs when valve 242 of heating coil 240 remains closed for a fixed period of time (i.e., heating of the supply air is not required during that period). This transition condition can result from the outdoor temperature rising to a point at which the air from supply duct 290 does not need mechanical heating or after the heating control signal has been at its minimum value (no-heat position) for a fixed period of time.

In state 302, the system is utilizing outdoor air to provide free cooling to the system. State 302 controls the supply air temperature by modulating dampers 260, 262, and 264 to adjust the mixing of outdoor air with return air (i.e., no mechanical heating or cooling). The amount of outdoor air that is mixed with the return air from return duct 292 is regulated to heat or cool the air being supplied via supply duct 290. Because there is no heating or mechanical cooling, the inability to achieve the setpoint temperature results in a transition to either state 301 or state 303. A transition occurs to state 301 for mechanical heating when either for a fixed period of time the flow of outdoor air is less than that required for proper ventilation or outdoor air inlet damper 262 remains in the minimum open position for a given period of time. The finite state machine makes a transition from state 302 to state 303 for mechanical cooling upon the damper control remaining in the maximum outdoor air position (e.g., 100% of the air supplied by the AHU is outdoor air) for a fixed period of time.

In state 303, chilled water valve 246 for cooling coil 244 is controlled to modulate the flow of chilled water and to control the amount of energy removed from the air. Further, ESC is used to modulate dampers 260, 262, and 264 to introduce an optimal amount of outdoor air into AHU 4. In an exemplary embodiment, a transition occurs to state 302 when the mechanical cooling does not occur for the fixed period of time (i.e., the cooling control is saturated in the no-cooling mode).

Figure 4:
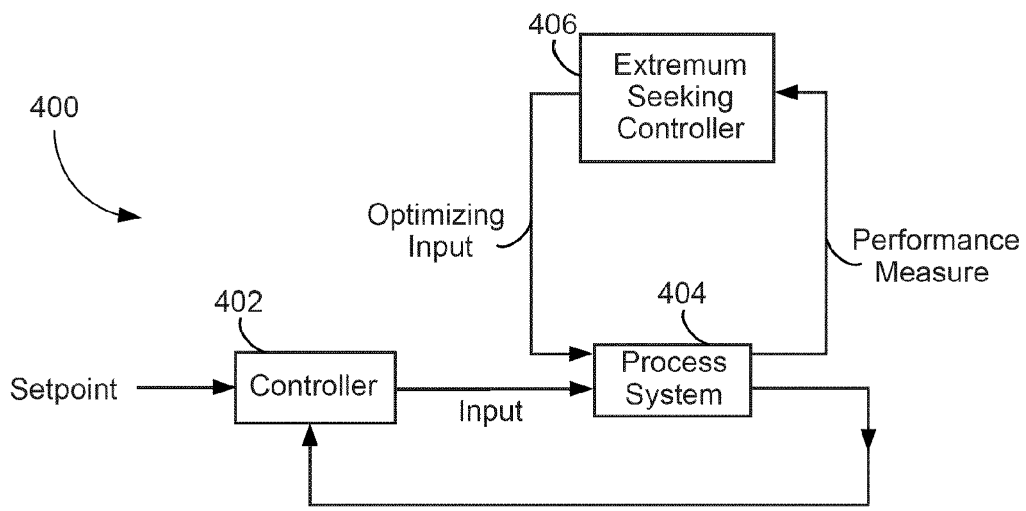
FIG. 4 is a diagram of a system for operating and optimizing a process system, according to an exemplary embodiment.

Referring now to FIG. 4, a simplified block diagram of a system 400 for operating and optimizing a process system 404 is shown, according to an exemplary embodiment. According to various exemplary embodiments, a process system is any electronic or mechanical system (one more hardware devices) that uses one or more input signals to controllably affect one or more output signals. The process system, for example, may be an air handling unit that uses setpoint and/or position inputs to affect one or more properties of air. According to other exemplary embodiments, the process system may be an energy conversion system (e.g., a wind turbine system, a photovoltaic system, a hydraulic energy conversion system, etc.), a hydraulic system, a pumping system, or the like that can be controlled for desirable performance.

System 400 is shown to include a controller 402 (e.g., a local controller, a feedback controller) that provides an input (e.g., an actuating input) to process system 404. The input may be provided to process system 404 as a function of a setpoint (or other inputs) received by controller 402. Extremum seeking controller 406 receives one or more outputs (e.g., a performance measure) from process system 404 and provides an optimizing input to process system 404 to optimize the process system's behavior (e.g., to optimize energy consumption, etc.).

Figure 5A:
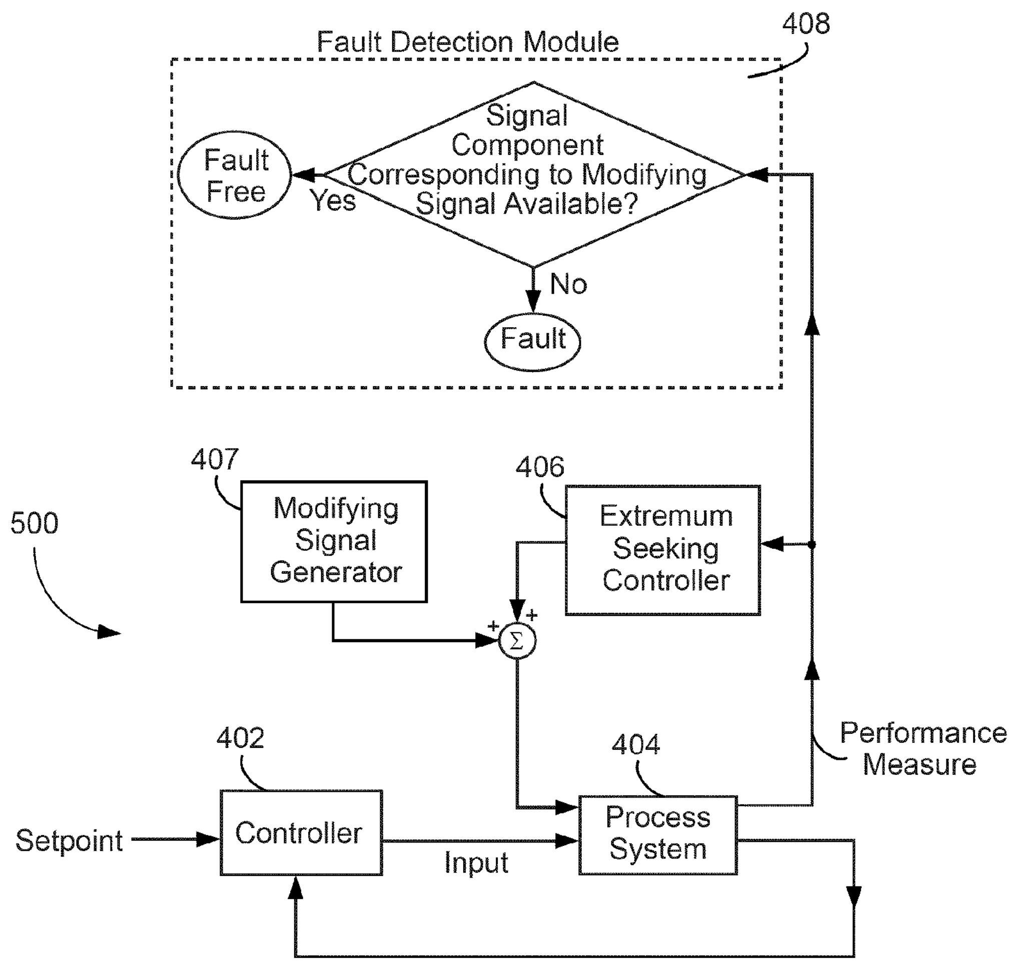
FIG. 5A is a diagram of the system of FIG. 4 with additional elements for detecting a fault in the process system, according to an exemplary embodiment.

Referring now to FIG. 5A, the diagram of FIG. 4 is shown with additional elements for detecting a fault in process system 404, according to an exemplary embodiment. Particularly, system 500 is shown to include modifying signal generator 407 and fault detection module 408. Modifying signal generator 407 is configured to modify an input of process system 404 with a modifying signal. Fault detection module 408 is configured to monitor an output of process system 404 for a signal component corresponding to a function of the modifying signal. Fault detection module 408 determines that process system 404 is fault free if the signal component is available. In other words, fault detection module 408 determines that process system 404 includes a fault based on at least one of a reduction of the signal component and an unexpected transformation of the signal component relative to the modifying signal.

As shown in FIG. 5A, the input modified is the input to process system 404 provided by extremum seeking controller 406. It should be noted that the modifying signal that modifies an input of process system 404 could be added to the system by extremum seeking controller 406. For example, a normal perturbation of the extremum seeking controller may be the modifying signal provided to the system.

Figure 5B:
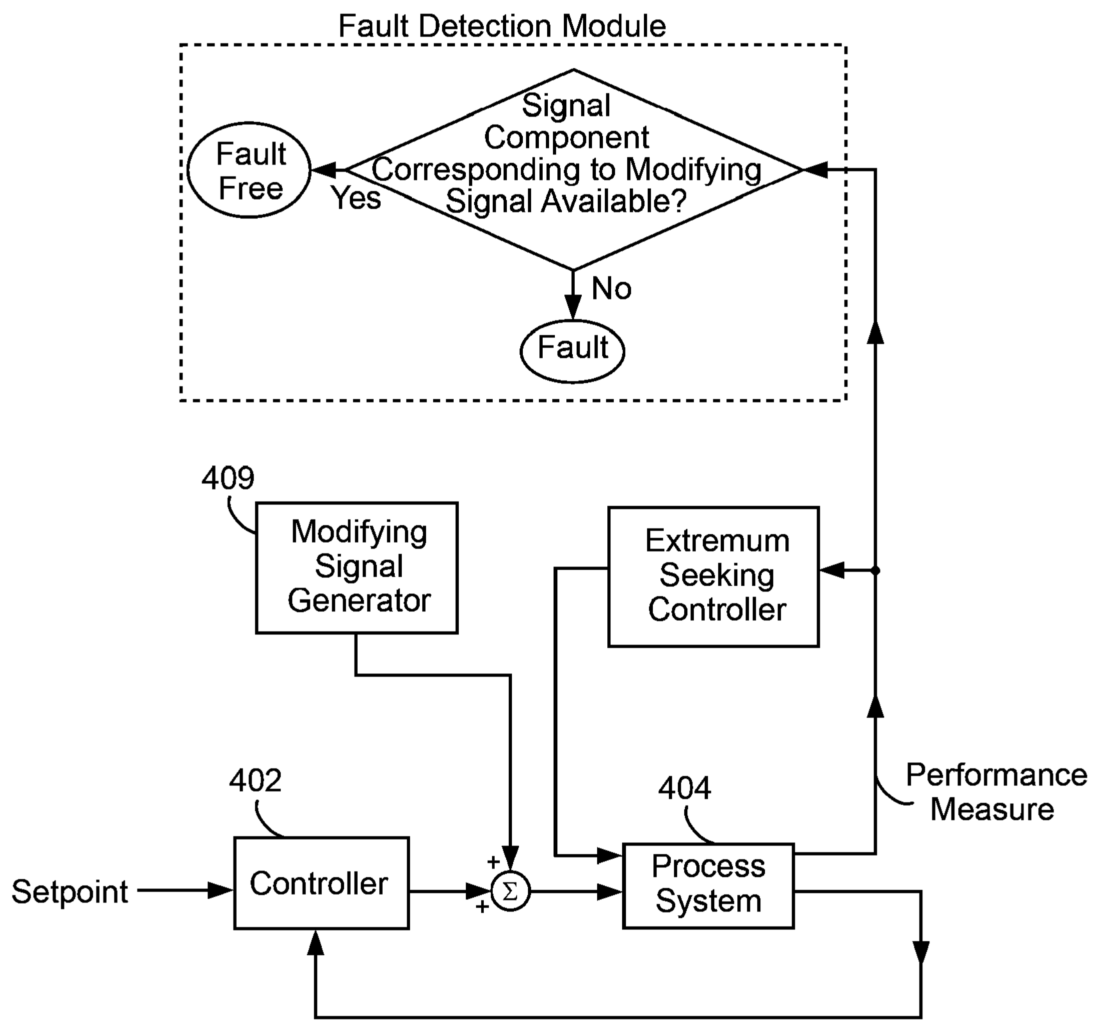
FIG. 5B is a diagram of the system of FIG. 4 with additional elements for detecting a fault in the process system, according to another exemplary embodiment.

It might be noted that, in various exemplary embodiments, the input modified for the purpose of fault detection may be other than an optimizing input. For example, FIG. 5B illustrates an embodiment in which signal generator 409 modifies an input provided to process system 404 from feedback controller 402.

Figure 6A:
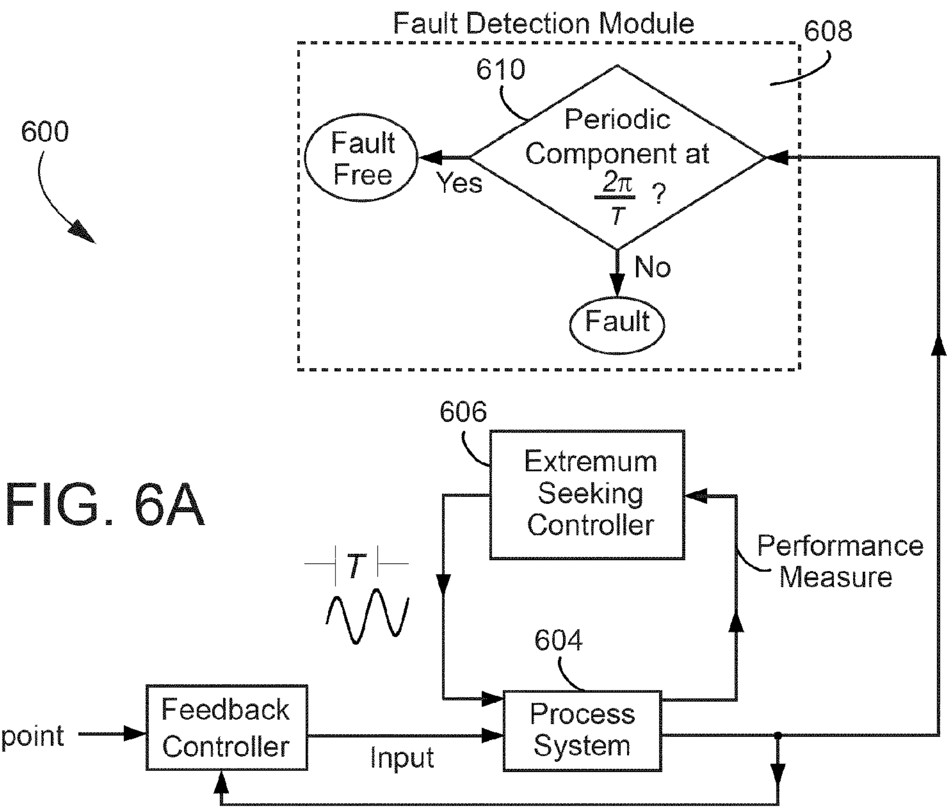
FIG. 6A is a diagram of the system of FIG. 4 with additional elements for detecting a fault in the process system, according to yet another exemplary embodiment.

Referring still to FIG. 5A, the output monitored by fault detection module 408 is a performance measure utilized in the control loop of extremum seeking controller 406. By contrast, system 600 of FIG. 6A illustrates fault detection module 608 receiving an output from process system 604 that is not fed back to extremum seeking controller 606. In the embodiment shown in FIG. 6A, extremum seeking controller 606 provides the modifying signal to an input of process system 604 without the assistance of a separate signal generator (e.g., modifying signal generator 407 as shown in FIG. 5A-B). In decision block 610 of fault detection module 608, an output from process system 604 is monitored for the periodic component of the modifying signal at $2\pi/T$, where T is the period of the modifying input. In other words, fault detection module 608 monitors for the periodic component of the modifying input at the angular frequency of the modifying signal.

Figure 6B:
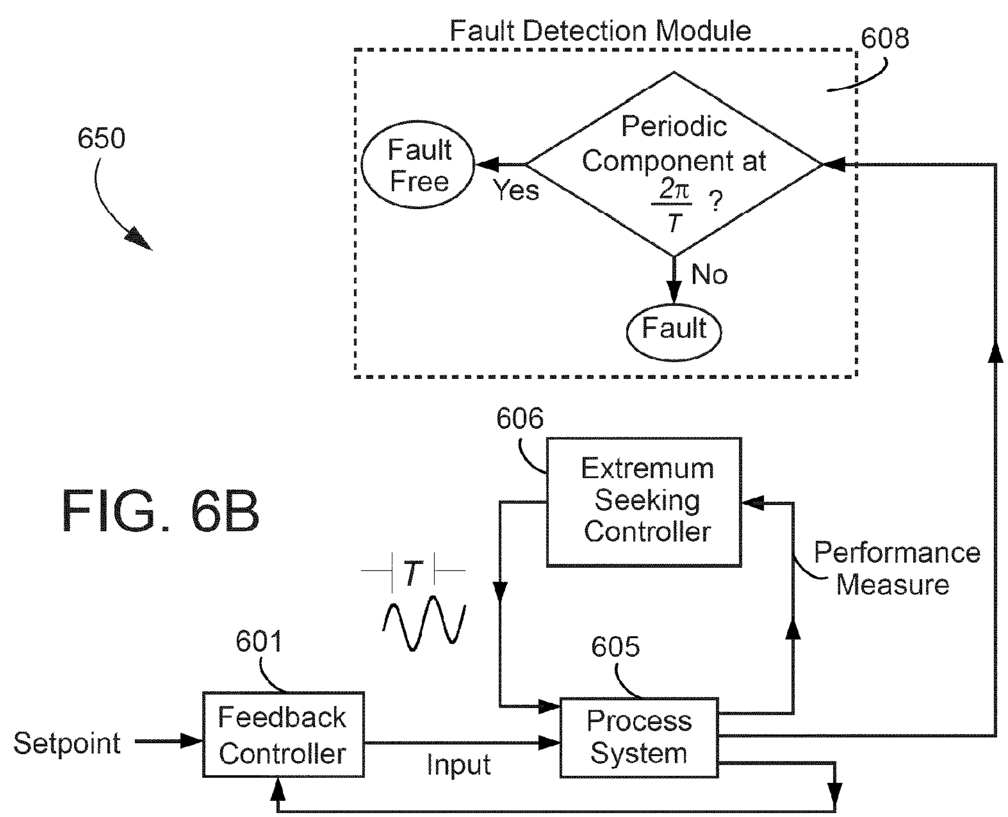
FIG. 6B is a diagram of the system of FIG. 4 with additional elements for detecting a fault in the process system, according to yet another exemplary embodiment.

It might be noted that, in various exemplary embodiments, any one or more outputs from the process system may be used by the fault detection module to monitor for the modifying input. For example, in system 650 of FIG. 6B, fault detection module 608 is shown receiving an output from process system 605 that is not provided back to either extremum seeking controller 606 or feedback controller 601. In various embodiments, the output monitored by the fault detection module may be generated by the process system itself, by one or more sensors utilized by the extremum seeking controller, the process system and/or by the feedback controller, or the output monitored by the fault detection module may be generated by a sensor not otherwise used by the system or used by a component remote from the system.

Figure 7:
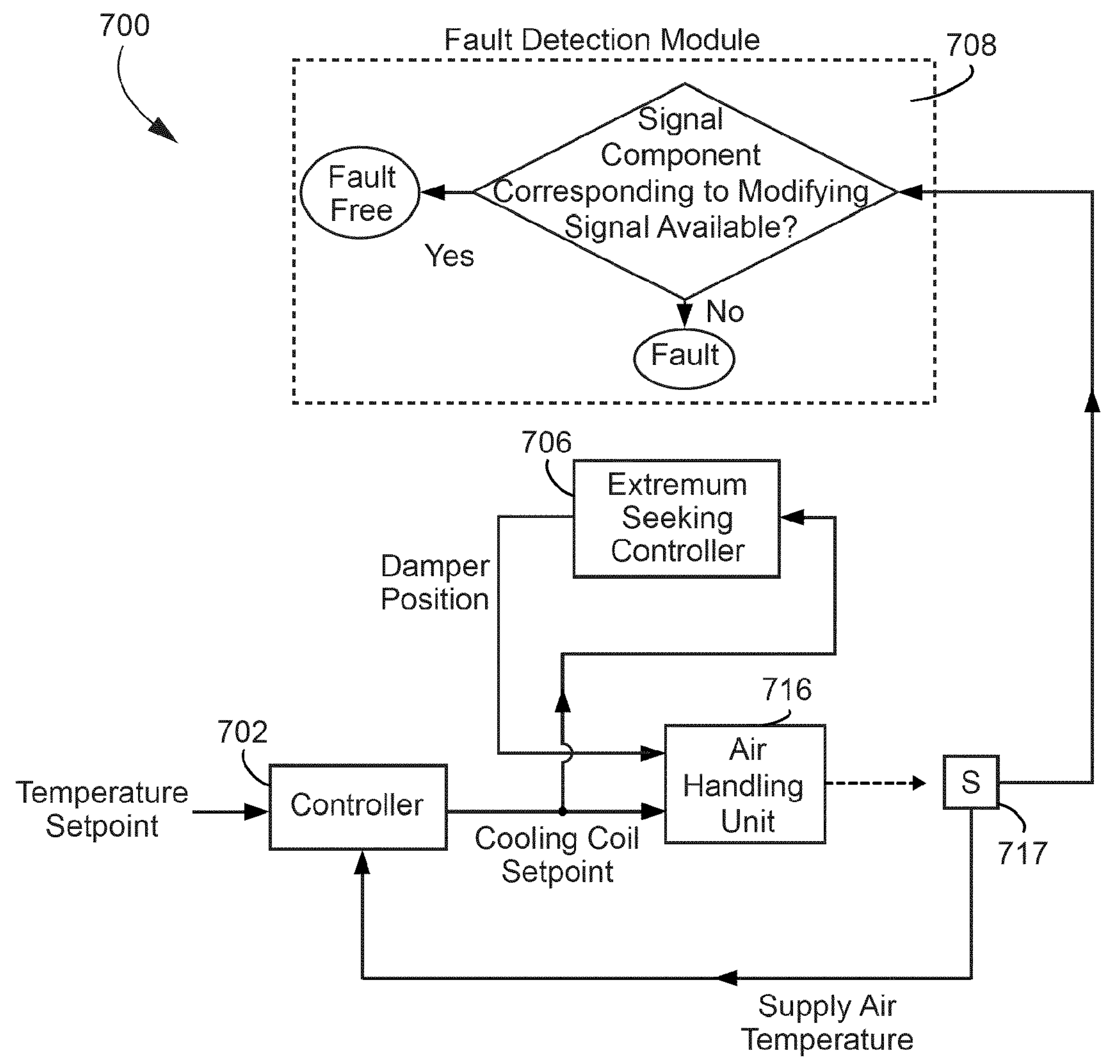
FIG. 7 is a diagram of a control system for an AHU, according to an exemplary embodiment.

Referring now to FIG. 7, a control system 700 for AHU 716 is shown, according to an exemplary embodiment. In control system 700, extremum seeking controller 706 provides a signal that controls the position of a damper associated with AHU 716. Feedback controller 702 provides a cooling coil value position, or another value, to control to AHU 716 and to extremum seeking controller 706. Feedback controller 702 determines the cooling coil setpoint based on a temperature setpoint received from a controller (e.g., a supervisory controller, an enterprise level controller, a field controller, a user interface, etc.) upstream of controller 702. According to an exemplary embodiment, the damper position is modulated in a manner that is calculated to cause expected perturbations in the supply air temperature affected by AHU 716 and sensed by temperature sensor 717. In the exemplary embodiment illustrated in FIG. 7, the output provided by temperature sensor 717 is provided to feedback controller 702 as a feedback signal and is provided to fault detection module 708. Fault detection module 708 is configured to monitor the signal(s) received from temperature sensor 717 for a signal component corresponding to the modulated damper position signal provided to AHU 716 by extremum seeking controller 716.

Figure 8:
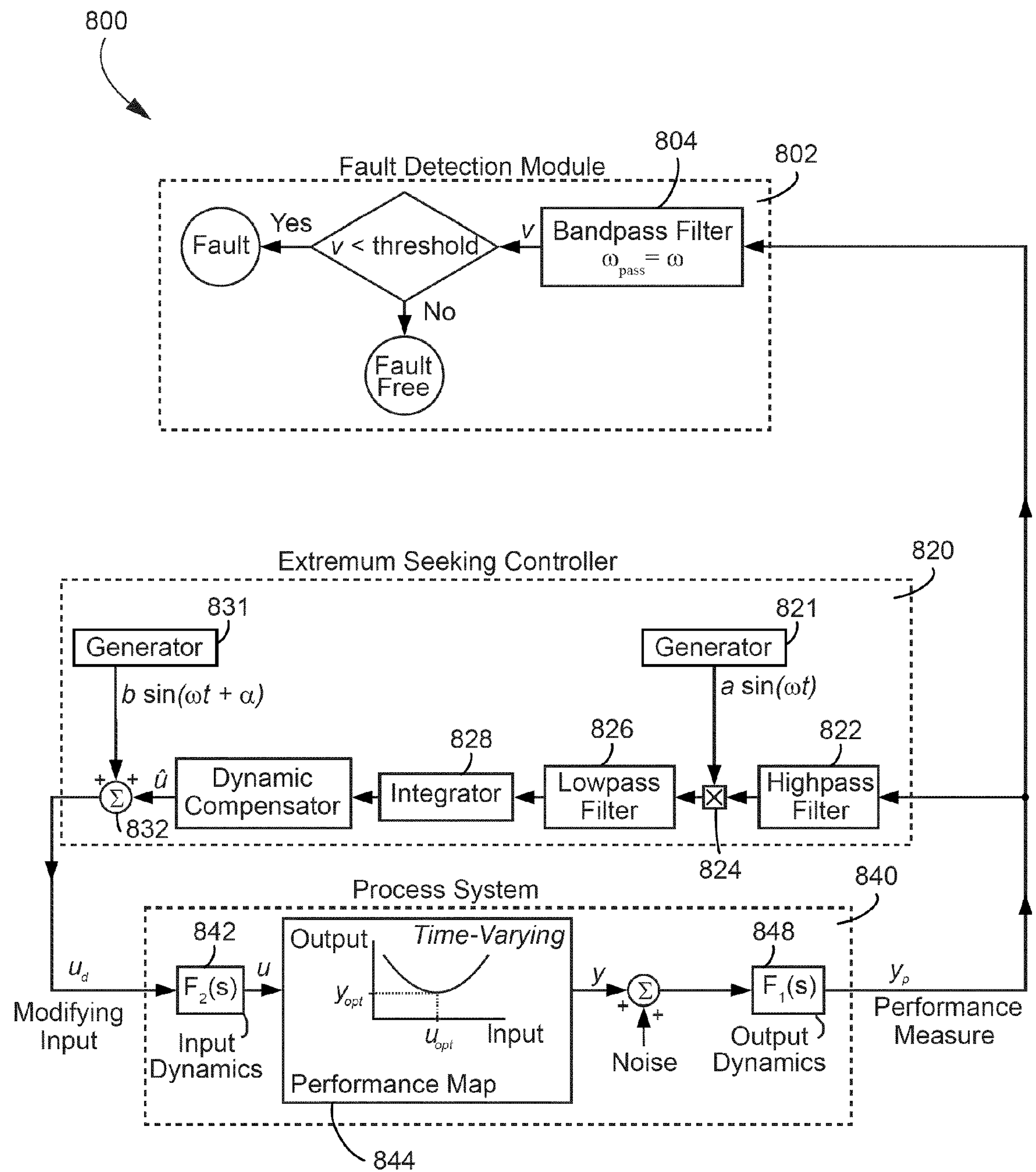
FIG. 8 is a detailed diagram of a system for operating and optimizing a process system and with additional elements for detecting a fault in the process system, according to an exemplary embodiment.

Referring now to FIG. 8, a block diagram of a system 800 is shown, according to an exemplary embodiment. In system 800, extremum seeking controller 820 determines a performance gradient through the use of high pass filter 822, a demodulation signal provided by generator 821, and a dither signal provided by generator 831. Integrator 828 is used to drive the performance gradient to zero in order to optimize the closed loop system created by extremum seeking controller 820 and process system 840. Process system 840 is represented mathematically as a combination of input dynamics 842, performance map 844, and output dynamics 848. Input dynamics 842 provides a function signal u which is passed to nonlinear performance map 844. The output of performance map 844 is then passed to output dynamics 848 to provide an output signal $y_p$. Extremum seeking controller 820 seeks to find a value for u that minimizes the output of performance map 844, thereby also minimizing output signal $y_p$. As an illustrative example, output signal yp may be represented by the expression:

$$y_p = p(u) = (u - u_{opt})^2$$

where p(u) represents the performance map and $u_{opt}$ represents the value at which p(u) is minimized. The actual representative format of a performance map for any particular process system is system and application specific. Output signal y is passed through output dynamics 848 to provide signal $y_p$, which is received by extremum seeking controller 820. The performance gradient signal is produced by perturbing the system by adding a dither signal to the ESC loop at processing element 832. Return signal $y_p$ (i.e., performance measure) is used to detect the performance gradient through the use of high-pass filter 822, a demodulation signal combined with (e.g., multiplied by) the output of high-pass filter 922 at processing element 924, and low-pass filter 826. The performance gradient is a function of the difference between u and $u_{opt}$. The gradient signal is provided as an input to integrator 828 to drive the gradient to zero, optimizing the control loop.

While various embodiments described throughout this disclosure relate to minimizing an output signal, minimizing an error, minimizing a gradient, minimizing the performance map, and the like, it should be appreciated that various other optimizing systems may seek to maximize similar or different values, controlled variables, or performance measures relating to a process system.

Referring still to FIG. 8, performance measure $y_p$ is provided from process system 840 to fault detection module 802. Fault detection module 802 is shown to include a bandpass filter 804 which is configured to filter out low and high frequencies around the angular frequency of the dither signal so that a signal component indicative of the dither signal can be extracted from performance measure signal $y_p$. If the value v of the signal provided by bandpass filter 804 is greater than a threshold, a signal component indicative of the dither signal was significantly preserved by process system 840, and fault detection module 802 will indicate that a fault does not exist. Conversely, if the value v of the signal provided by bandpass filter 804 is less than or equal to the threshold, a signal component indicative of the dither signal was not significantly preserved by process system 840, and fault detection module 802 will indicate that a fault exists.

Figure 9:
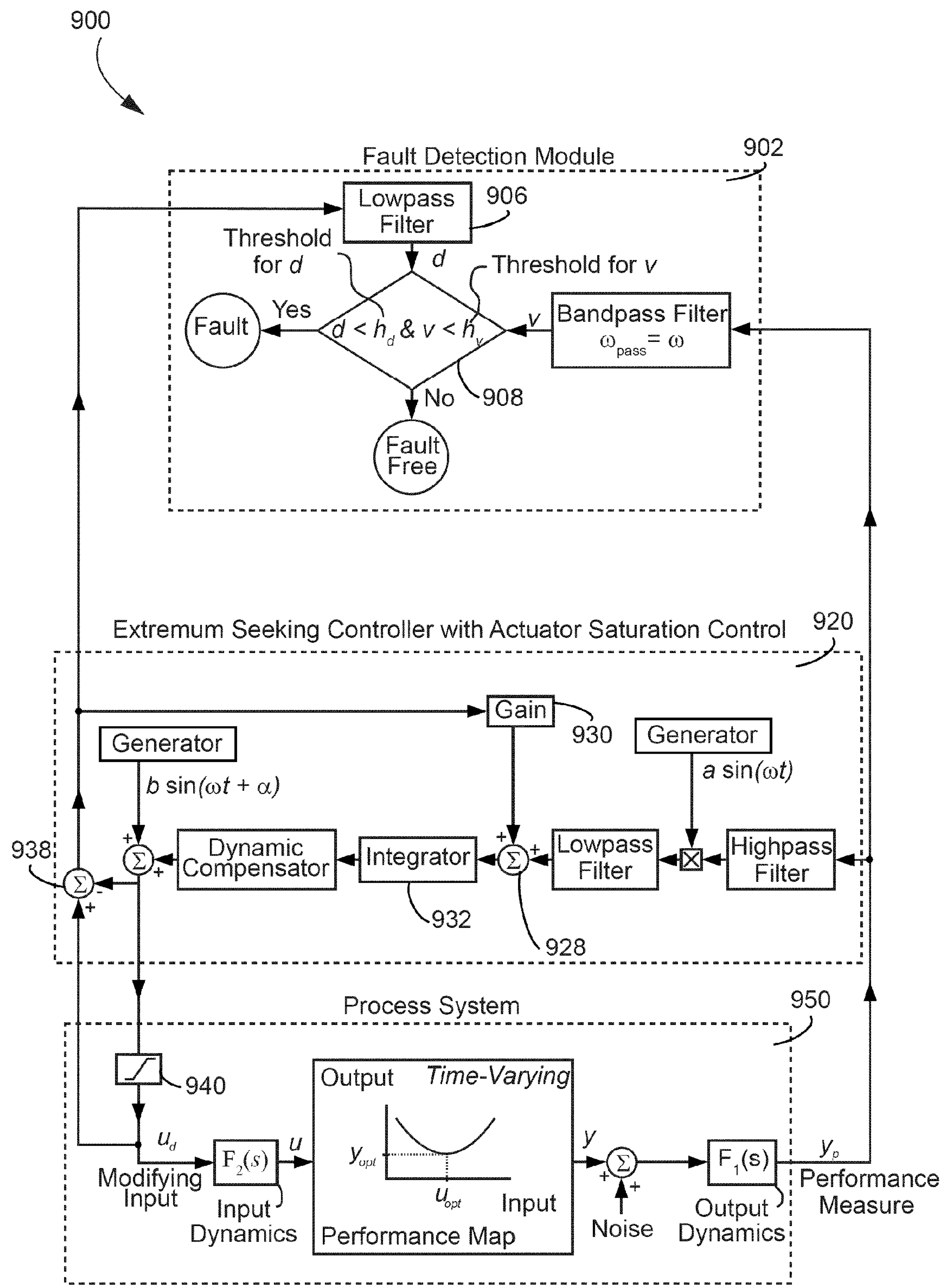
FIG. 9 is a diagram of an self-optimizing system that utilizes an extremum seeking controller with actuator saturation control, according to an exemplary embodiment.

Referring now to FIG. 9, a block diagram of a system 900 having an extremum seeking controller with actuator saturation control 920 is shown, according to an exemplary embodiment. Feedback from actuator 940 (e.g., an actuator for an AHU damper, the element being directly adjusted by the extremum seeking controller) has been added to system 900 to limit the effects of actuator saturation. The difference between the input and output signals for actuator 940 controlled by extremum seeking controller 920 is calculated at processing element 938. In an exemplary embodiment, processing element 938 computes the difference between the signal sent to the actuator and a measurement taken at the actuator that is indicative of the physical output of the actuator. The difference signal produced by processing element 938 is then amplified by a gain 930 and added to the input of integrator 932 at processing element 928, thereby limiting the input to integrator 932 and preventing the integrator from entering a condition known as "winding up." In an exemplary embodiment, processing element 938 is implemented in software (e.g., stored in memory as code and executed by a processing circuit) and compares the signal output to the actuator to a stored range of values corresponding to the physical limits of the actuator.

Referring still to FIG. 9, the difference signal produced by processing element 938 is provided to fault detection module 902 with performance measure $y_p$ from process system 950. Fault detection module 902 includes a low pass filter 906 for removing noise from the signal received from element 938. Fault detection module 902 includes a decision block 908 where the output from low pass filter 902 is checked for an actuator saturation condition in addition to the presence of a dither signal component. If the difference d between the actuator input and the actuator output is small relative to a threshold $h_d$ for the actuator saturation condition, then the actuator will be known to not be saturated. When v is smaller than the threshold $h_v$ for identifying the presence of the signal component indicative of the dither added to the system and the actuator is not saturated, the fault detection module will determine that a fault exists in the system (e.g., and that the lack of the dither signal component on the output is not simply due to the actuator being temporarily saturated). According to an exemplary embodiment, the difference d between the actuator input and the actuator output is low-pass filtered to remove noise or other transient states of the difference signal.

Figure 10:
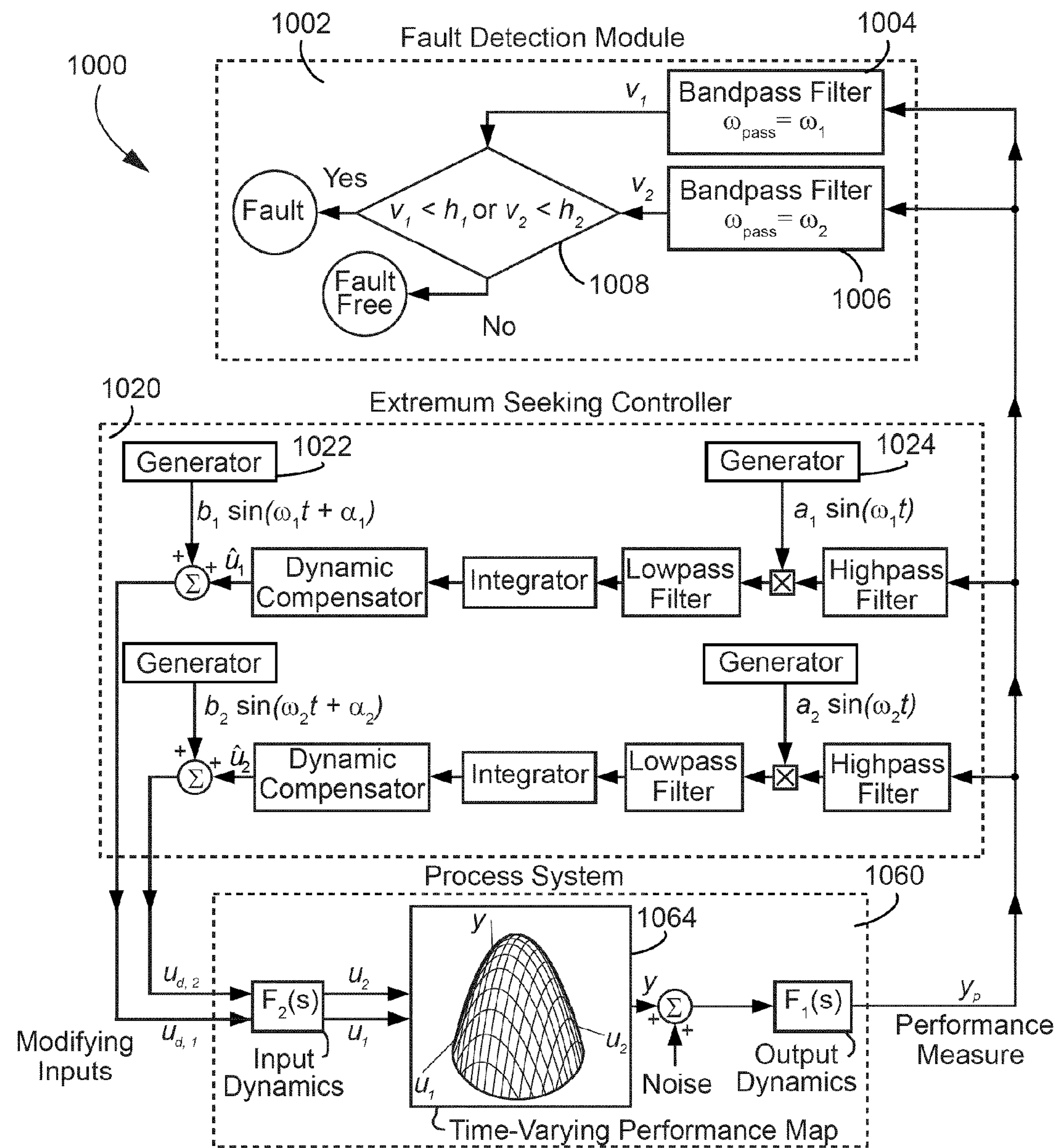
FIG. 10 is a diagram of a system configured to utilize multi-variable extremum seeking control output for fault detection of the system, according to an exemplary embodiment.

Referring now to FIG. 10, a block diagram of a system 1000 having a multi-variable extremum seeking controller 1020 is shown, according to an exemplary embodiment. Extremum seeking controller 1020 seeks to optimize process system inputs $u_1$ and $u_2$ to minimize the output of performance map 1064. In other words, extremum seeking controller 1020 works to drive two performance gradients to zero by perturbing process system 1060 in two different ways (e.g., by modifying input signals provided by generator 1022 and generator 1024). According to the exemplary embodiment shown in FIG. 10, fault detection module 1002 includes two bandpass filters 1004 and 1006 configured to extract the two modifying input signals used to perturb process system 1060 by extremum seeking controller 1020. Particularly, bandpass filter 1004 is configured to monitor for angular frequencies according to $\omega_1$, the angular frequency at which generator 1022 provides its dither signal, and bandpass filter 1006 is configured to monitor for angular frequencies according to $\omega_2$, the angular frequency at which generator 1024 provides its dither signal. Decision element 1008 checks for whether either the output from bandpass filter 1004 or the output from bandpass filter 1006 indicates a fault in the system.

Figure 11:
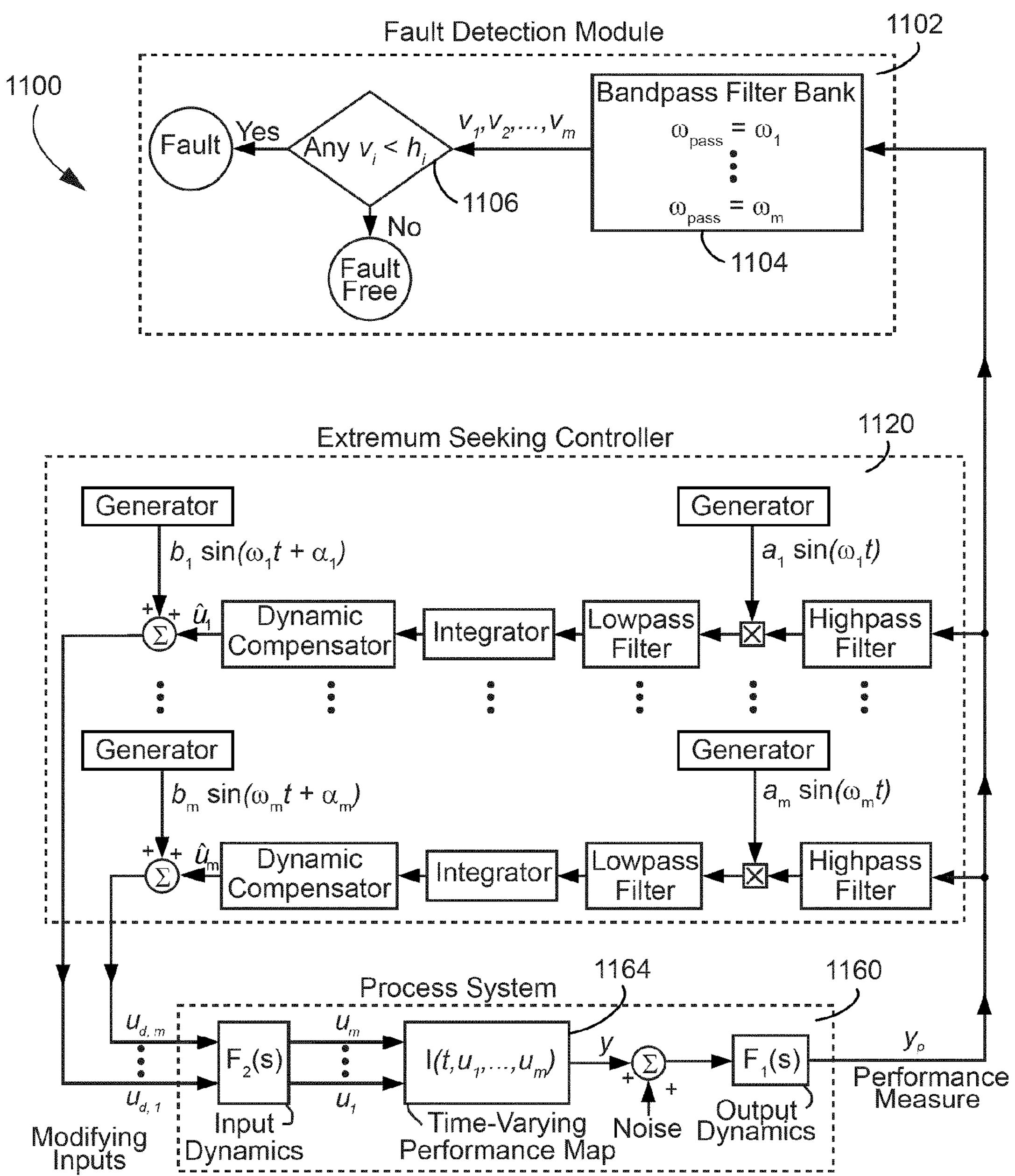
FIG. 11 is a diagram of a system configured to utilize multi-variable extremum seeking control output for fault detection of the system, according to another exemplary embodiment.

Referring now to FIG. 11, extremum seeking controller 1120 is shown to configured for multi-variable optimization to include m modifying inputs to process system 1160 and to seek the minimization of m performance gradients. Accordingly, system 1100 includes fault detection module 1102 including bandpass filter bank 1104 for monitoring for all of the dither signals provided by the various generators of extremum seeking controller 1120. Decision block 1106 checks for whether any of the bandpass filter outputs indicate a fault in the system (e.g., whether any of the bandpass filter outputs indicates that a modifying input has not expectedly propagating through the system to the output of process system 1160).

Referring generally to the exemplary embodiments shown in FIGS. 5-11 and various contemplated alternatives thereof, it should be noted that any number of modifying inputs may be provided to the process system and any number of process system outputs may be present in the system and used by the extremum seeking controller and the fault detection module to conduct the fault detection activities described herein. While some of the fault detection modules shown in FIGS. 5-11 utilize bandpass filters to isolate/monitor performance measures of the system for signal components indicative of the modifying signals added to the system, it should be noted that other configurations and methods may be used. For example, in some exemplary embodiments, a frequency domain analysis using, for example, a fast Fourier transform (FFT) may be used to monitor for the signal component and to detect faulty operation. In yet other exemplary embodiments, the variation of system output can be tracked using time-domain (e.g., zero-cross detection) analysis. In various embodiments having a bandpass filter, the bandpass filter may have a passband of $0.8*\omega_d \sim 1.2*\omega_d$. In various other embodiments having a bandpass filter, the bandpass filter may be a second order Butterworth filter with a passband of $0.8*\omega_d \sim 3.5*\omega_d$. The passband of $0.8*\omega_d \sim 3.5*\omega_d$ may account for systems in which some nonlinearity in the static map produces strong second or third harmonics that can be observed for fault detection purposes. Further, a variety of additional processing may be applied to monitored and/or filtered signal components for fault detection purposes. For example, the mean average difference (MAD) or the standard deviation (STD) of a performance measure may be examined for faults. Other types of statistical analysis of the performance measure may also or alternatively be conducted to determine if the indicia of a modifying input added to the system is present in the performance measure.

Figure 12:
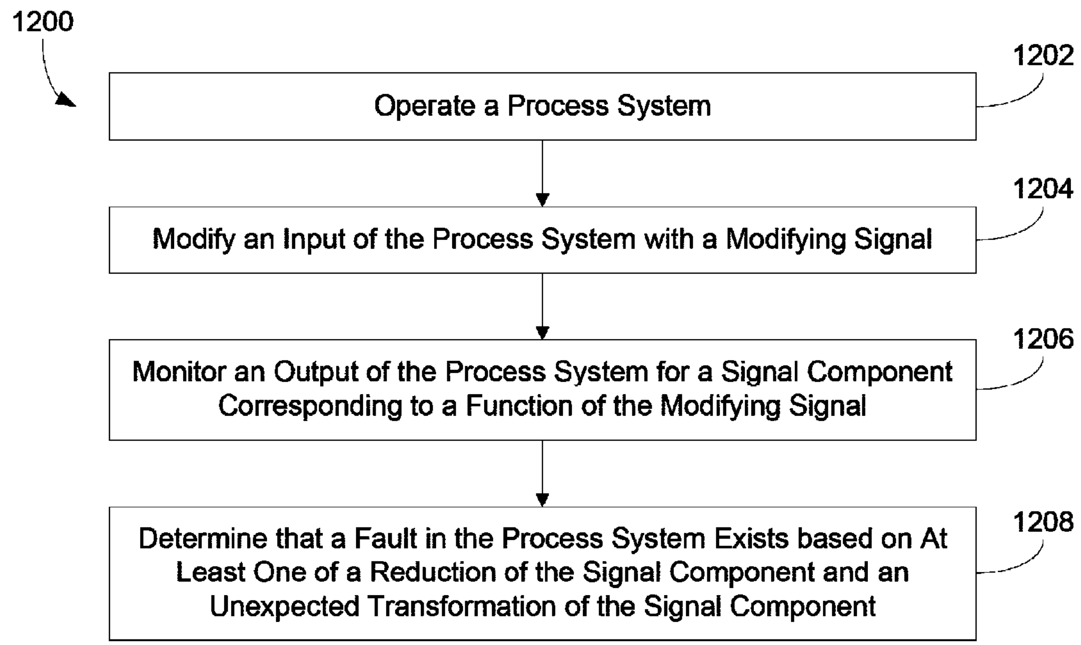
FIG. 12 is a flow chart of a process for detecting a fault in a process system, according to an exemplary embodiment.

Referring now to FIG. 12, a flow diagram of a process 1200 for detecting a fault in a process system is shown, according to an exemplary embodiment. Process 1200 is shown to include operating the process system (step 1202), which may include one or more steps for optimizing the system. Process 1200 is further shown to include modifying an input of the process system with a modifying signal (step 1204). In various exemplary embodiments, modifying the input of the process system with a modifying signal in step 1204 may be a part of the one or more steps for optimizing the system (e.g., the modifying signal may be used in the optimization process). Process 1200 is further shown to include monitoring an output of the process system for a signal component corresponding to a function of the modifying signal (step 1206). The signal component may be a harmonic of the modifying signal, amplitude or phase corresponding to the modifying signal, or any other indicia of the modifying signal at an output of the process system. Process 1200 further includes determining that a fault in the process system exists based on at least one of a reduction of the signal component and an unexpected transformation of the signal component (step 1208). If the signal component is received at the process system output as expected, on the other hand, a determination may be made that no fault in the system exists.

Figure 13:
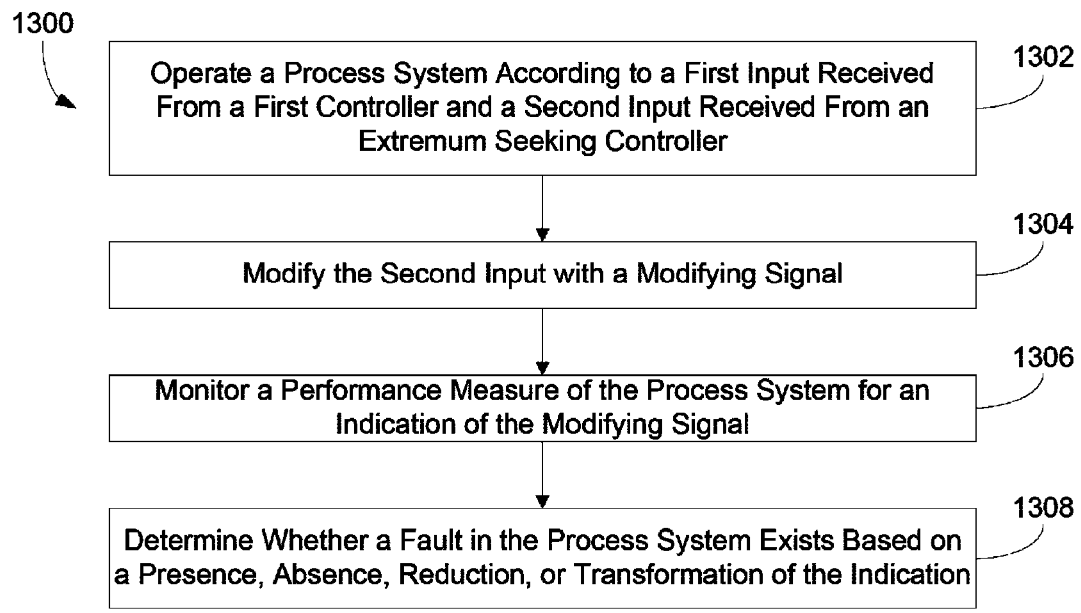
FIG. 13 is a flow chart of a process for detecting a fault in a process system, according to another exemplary embodiment.

Referring now to FIG. 13, a flow diagram of a process 1300 for detecting a fault in a process system is shown, according to another exemplary embodiment. The process system of process 1300 utilizes an extremum seeking controller and process 1300 is shown to include the step of operating the process system according to a first input received from a first controller and a second input received from an extremum seeking controller (step 1302). Process 1300 further includes modifying the second input with a modifying signal (step 1304). According to an exemplary embodiment, the modifying signal is a sinusoidal dither signal applied to the process system as a part of the extremum seeking control strategy. Process 1300 is also shown to include monitoring a performance measure of the process system for an indication of the modifying signal (step 1306) and determining whether a fault in the process system exists based on a presence, absence, reduction, or transformation of the indication (step 1308).

Figure 14:
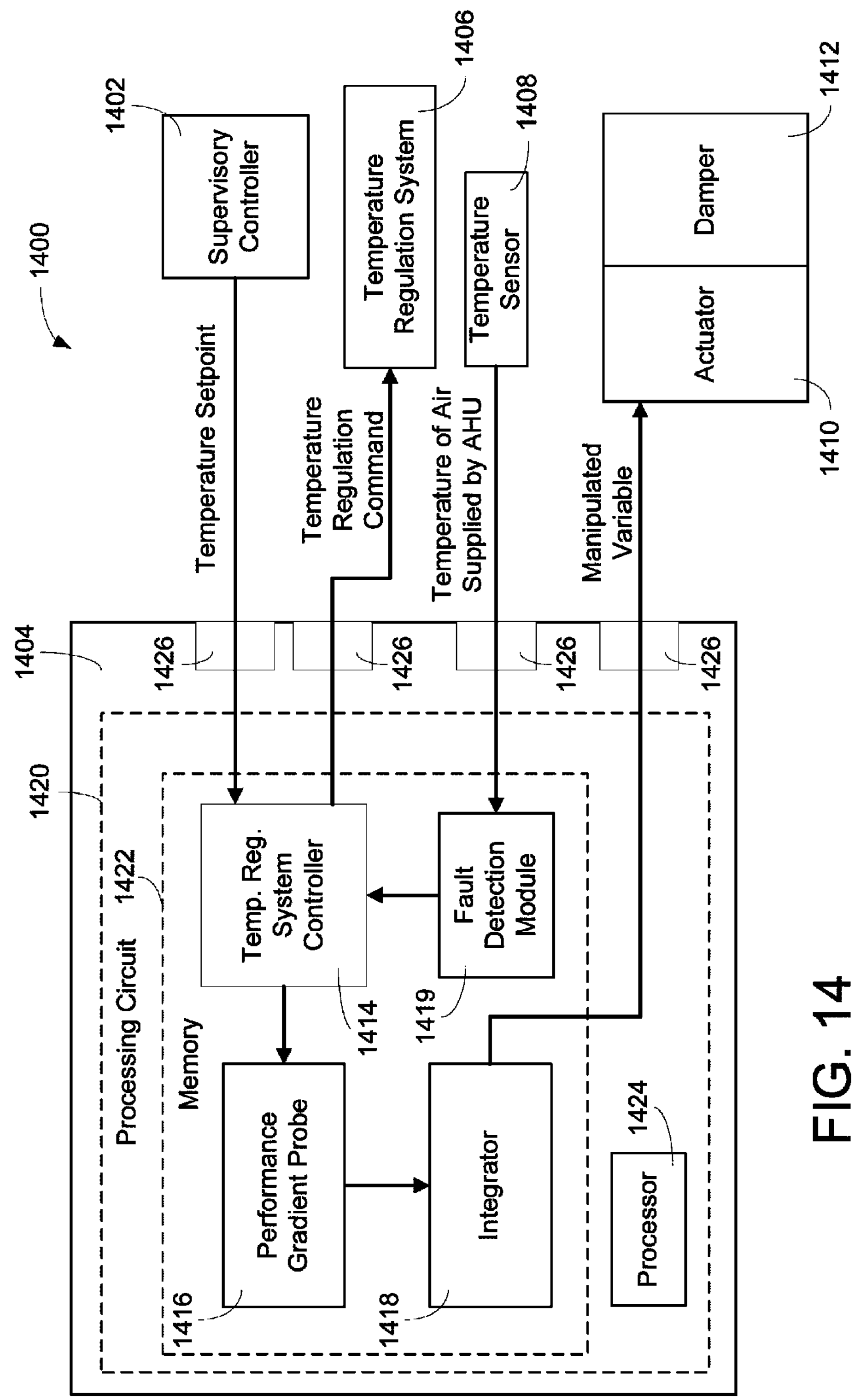
FIG. 14 is a block diagram of a control system for affecting the temperature of a building space, according to an exemplary embodiment.

Referring now to FIG. 14, a block diagram of a control system 1400 for affecting the temperature of a building space is shown, according to an exemplary embodiment. Control system 1400 includes a supervisory controller 1402, a controller 1404, a temperature regulation system 1406, a temperature sensor 1408, an actuator 1410, and a damper 1412. Controller 1404 receives temperature setpoint information from supervisory controller 1402. The temperature setpoint is used to drive a control loop including the temperature regulation system 1406, temperature sensor 1408, and temperature regulation system controller 1414. Temperature regulator system controller 1414 compares the temperature measured by temperature sensor 1408 and received via interface 1426 to the setpoint temperature provided by supervisory controller 1402 via an interface 1426. A temperature regulation command signal is provided to temperature regulation system 1406 via an interface 1426. Temperature regulation system 1406 provides mechanical heating or cooling in order to drive the temperature of the air affected by the system to the setpoint. Controller 1404 further includes a control loop that controls the position of damper 1412 (e.g., outdoor air damper) via actuator 1410 and interface 1426. The control loop that controls the position of damper 1412 searches for a setting for the damper that minimizes the power consumed by temperature regulation system 1406. A performance gradient probe 1416 detects a difference between the optimal settings for damper 1412 and the current settings for damper 1412. In an exemplary embodiment, performance gradient probe 1416 identifies a performance gradient between actual and optimal performance of the system. Integrator 1418 is configured to minimize the gradient by producing an actuator command signal to drive actuator 1410 to its optimal setting. Actuator 1410 receives the actuator command signal and regulates damper 1412, controlling a flow of air relating to temperature regulator system 1406.

In the exemplary embodiment illustrated in FIG. 14, controller 1404 is implemented with a processing circuit 1420, memory 1422, and processor 1424. According to an exemplary embodiment, processor 1424 and/or all or parts of processing circuit 1420 can be implemented as a general purpose processor, an application specific integrated circuit (ASIC), one or more field programmable gate arrays (FPGAs), a group of processing components, one or more digital signal processors, etc. Memory 1422 (e.g., memory unit, memory device, storage device, etc.) may be one or more devices for storing data and/or computer code for completing and/or facilitating the various processes described in the present disclosure. Memory 1422 may include a volatile memory and/or a non-volatile memory. Memory 1422 may include database components, object code components, script components, and/or any other type of information structure for supporting the various activities described in the present disclosure. According to an exemplary embodiment, memory 1422 is communicably connected to processor 1424 and includes computer code for executing (e.g., by processor 1424) one or more processes described herein. Memory 1422 may also include various data regarding the operation of one or more of the control loops relevant to the system (e.g., performance map data, historical data, behavior patterns regarding energy used to adjust a temperature to a setpoint, etc.). In an exemplary embodiment, the functions of controller 1404 are implemented as software within memory 1422 of processing circuit 1420 and components 1414, 1416, 1418, and 1420 are software modules of the system. Fault detection module 1419 may be configured to detect faults by monitoring temperature sensor data retrieved over a period of time for indicia of a signal component added to the actuator command signal provided to actuator 1410.

According to the exemplary embodiments shown in at least FIGS. 5A-11, systems implementing the fault detection circuits, modules, and/or methods described herein are closed-loop systems using feedback to make decisions about changes to the input that drives the process system.

The construction and arrangement of the systems and methods as shown in the various exemplary embodiments are illustrative only. Although only a few embodiments have been described in detail in this disclosure, many modifications are possible. All such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, the order of the steps may differ from what is depicted. Also two or more steps may be performed concurrently or with partial concurrence. Such variations will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A fault detection system for detecting a fault in a process system, comprising:

a first circuit configured to modify an input of the process system with a periodic modifying signal, wherein the first circuit is part of an extremum seeking controller and wherein the periodic modifying signal applied to the input of the process system comprises a dither signal applied to the input for probing for a performance gradient used by the extremum seeking controller to optimize the process system; and a second circuit configured to receive an output from the process system and to compare a signal component from the output of the process system to a function of the dither signal and to determine whether a fault exists based on at least one of a detected reduction of the signal component and an unexpected transformation of the signal component;

wherein the second circuit is configured to provide an output signal indicative of the presence of the fault to at least one of a computerized system, a memory device, a communications device, and an electronic display.

2. A controller for detecting a fault in a process system, the controller comprising:

a circuit configured to affect an input of the process system according to an extremum seeking control strategy, wherein the circuit is configured to modify the input with a periodic modifying signal having a dither signal at a first frequency as a part of the extremum seeking control strategy, wherein the circuit controls at least one manipulated variable of the process system by using the periodic modifying signal to identify a performance gradient in the process system, wherein the extremum seeking control strategy operates to drive the performance gradient to zero;

wherein the circuit is further configured to monitor an output of the process system for a signal component corresponding to a function of the first frequency of the dither signal periodic modifying signal, and wherein the circuit is further configured to determine whether the fault exists based on at least one of a reduction of the signal component and an unexpected transformation of the signal component;

wherein the circuit is further configured to provide an output signal indicative of the presence of the fault to at least one of a computerized system, a memory device, a communications device, and an electronic display device.

3. The controller of claim 2, wherein the process system comprises a temperature regulator configured to regulate temperature in response to a first control signal, and wherein the process system further comprises a damper moved by an actuator;

wherein the circuit is configured to operate the actuator by providing a second control signal to the actuator, and wherein modifying the input of the process system with a periodic modifying signal comprises modifying the second control signal provided to the actuator with the periodic modifying signal.

4. The controller of claim 3, wherein the circuit is configured to operate the actuator according to the extremum seeking control strategy.

5. The controller of claim 2, wherein the circuit comprises:

a filter configured to filter the output of the process system to extract the signal component from the output.

6. The controller of claim 5, wherein the filter comprises a bandpass filter.

7. The controller of claim 2, wherein the circuit is configured to compare the signal component to a threshold power level to determine whether the fault exists.

8. The controller of claim 2, wherein the periodic modifying signal is at least one of rectangular, triangular, ellipsoidal, and sinusoidal.

9. The controller of claim 2, wherein the circuit determining that the fault exists comprises at least one of:

(a) comparing the signal component to a threshold power level at a frequency corresponding to the periodic modifying signal; and (b) comparing a phase of the signal component to an expected phase based on the periodic modifying signal.

10. The controller of claim 2, wherein the circuit monitoring the output of the process system for a signal component corresponding to a function of the periodic modifying signal comprises at least one of:

(a) extracting the signal component from the output using a filter configured with a passband including an angular frequency component of the periodic modifying signal;

(b) conducting a frequency domain analysis of the output using a fast Fourier transform; and (c) conducting a time-domain analysis of the output using a zero-cross detection method.

11. The controller of claim 2, wherein the output is fed back to the first circuit for operating the process system as a closed-loop system.

12. The controller of claim 2, wherein the input to the process system is provided by the circuit to the process system for operating the process system as a closed-loop system.

13. The controller of claim 2, wherein the circuit is configured to operate the process system as a closed-loop a feedback controller according to the extremum seeking control strategy.

14. A computerized method for detecting a fault in a process system, the method comprising:

modifying an input of the process system with a modifying signal to determine whether the fault exists in the process system;

optimizing the process system utilizing the output according to an extremum seeking control strategy, wherein the modifying signal comprises a dither signal provided to the input as a part of the extremum seeking control strategy;

monitoring an output of the process system for a signal component corresponding to a function of the modifying signal;

determining whether a fault exists by comparing the signal component from the output of the process system to the function of the modifying signal based on at least one of a reduction of the signal component and an unexpected transformation of the signal component; and providing an output representing the fault determination to at least one of an electronic display and communications electronics.

15. The method of claim 14, wherein the dither signal is at least one of rectangular, triangular, ellipsoidal, and sinusoidal.

16. The method of claim 14, further comprising:

extracting the signal component from the output using a filter network.

17. The method of claim 14, wherein determining that the fault exists comprises at least one of:

(a) comparing the signal component to a threshold power level corresponding to the periodic modifying signal; and (b) comparing a phase of the signal component to an expected phase based on the modifying signal.

18. The method of claim 14, wherein monitoring for the output of the process system for a signal component corresponding to a function of the modifying signal comprises at least one of:

(a) extracting the signal component from the output using a filter configured with a passband including an angular frequency component of the modifying signal;

(b) conducting a frequency domain analysis of the output using a fast Fourier transform; and (c) conducting a time-domain analysis of the output using a zero-cross detection method.

19. The method of claim 14, wherein the process system is an heating, ventilation, or air conditioning system.

* * * * *